United States Patent [19]
Lund

[11] Patent Number: 6,154,227
[45] Date of Patent: Nov. 28, 2000

[54] APPARATUS AND METHOD FOR PRINTING COMPENSATION

[75] Inventor: Mark D Lund, Vancouver, Wash.

[73] Assignee: Hewlett-Packard Company, Palo Alto, Calif.

[21] Appl. No.: 08/986,910

[22] Filed: Dec. 8, 1997

[51] Int. Cl.$^7$ ..................................................... B41J 29/38
[52] U.S. Cl. .............................................................. 347/14
[58] Field of Search .................................... 347/14, 16, 19, 347/105, 9, 15

[56] References Cited

U.S. PATENT DOCUMENTS

| | | | |
|---|---|---|---|
| 5,049,898 | 9/1991 | Arthur et al. ................................ | 347/19 |
| 5,235,351 | 8/1993 | Koizumi ...................................... | 347/14 |
| 5,272,503 | 12/1993 | LaSuer et al. .............................. | 399/25 |
| 5,285,220 | 2/1994 | Suzuki et al. ............................... | 347/14 |
| 5,353,051 | 10/1994 | Katayama et al. ......................... | 347/13 |
| 5,387,976 | 2/1995 | Lesniak ...................................... | 347/19 |
| 5,502,468 | 3/1996 | Knierim ..................................... | 347/19 |
| 5,504,507 | 4/1996 | Watrobski et al. ......................... | 347/19 |
| 5,625,384 | 4/1997 | Numata et al. ............................ | 347/23 |
| 5,812,156 | 9/1998 | Bullock et al. ............................ | 347/19 |

FOREIGN PATENT DOCUMENTS

| | | | |
|---|---|---|---|
| 0517521 | 12/1992 | European Pat. Off. ......... | B41J 2/205 |
| 0517543 | 12/1992 | European Pat. Off. ......... | B41J 2/205 |
| 0687565 | 12/1995 | European Pat. Off. ......... | B41J 2/205 |
| 720 916 A2 | 7/1996 | European Pat. Off. . | |

OTHER PUBLICATIONS

Xerox Disclosure Journal, "Storage of Operating Parameters in Memory Integral with Printhead," vol. 8, No. 6, Nov./Dec. 1983, p. 503.

Hewlett–Packard Patent Application S/n 08/978,040; Filed Nov. 25, 1997; "Ink Drop Volume Variance Compensation For Injet Printing".

*Primary Examiner*—John Barlow
*Assistant Examiner*—Juanita Stephens

[57] ABSTRACT

A printing system that adjusts to drop volume characteristics of pens installed within an associated printer. Each pen has a characteristic drop volume representing the typical volume of ink expelled by the pen in forming ink drops used to form output pixels. Up to a maximum of N drops are used to form each pixel. A printer driver receives print data for the printer indicating saturation values for pixel data to be printed. Based on an expected pen drop volume, each saturation value maps to a corresponding number of ink drops for that value. To reduce data volume sent to the printer, the range of zero to N drops is subdivided into levels, each level representing some number of drops per pixel, and this level data is sent to the printer. If the characteristic drop volume of the pen is different from the expected volume, the subdivision of levels can be adjusted to compensate for differences in drop volumes. A related method includes the steps of defining at least first, second, and third levels of printing saturation, where in the first, second, and third level are respectively ejected N1, N2, and N3 droplets of ink per pixel. This method includes receiving data related to a characteristic drop volume associated with the printing system, and setting the value of at least one of {N1, N2, or N3}0 in accordance with the received data. The characteristic drop volume may be stored within a memory associated with each pen.

14 Claims, 8 Drawing Sheets

Number of Droplets per 1/300th cell

FIG. 4B

Number of Droplets per 1/300th cell

300 DPI high-fidelity levels

FIG. 5B

300 DPI binary options
(Better imaging)

FIG. 6A

600 DPI high-fidelity levels

FIG. 6B

600 DPI binary options
(Better Lines & Text)

APPARATUS AND METHOD FOR PRINTING COMPENSATION

FIELD OF THE INVENTION

The present invention relates to methods and apparatuses for providing uniform print output notwithstanding manufacturing variations in a printing device.

BACKGROUND AND SUMMARY OF THE INVENTION

Conventional color printers typically have print resolutions of 300, 600, 1200 or higher dots per inch (DPI). These printers generally produce color output through use of separate ink pens for each color. In the specification and claims that follow, references to pens includes alternate color-delivery mechanisms such as ribbons, powder, wax, spray nozzles, and the like, in which pixels or microdots (sub-pixels) of ink ,are transferred or blended on tangible mediums such as paper. The terms microdots and droplet are used interchangeably herein, as are the terms pixel and dot. Additionally, the technology disclosed herein, as far as applicable, is intended to include output to intangible mediums such as computer displays.

Note that it is assumed that a printer is printing at 300 DPI (or 600 DPI when noted), and that values referenced herein are for exemplary purposes only. Although values may correspond to printing at 300 DPI resolution, claimed embodiments apply to other resolutions as well. This invention applies to printing techniques where output pixels are formed of more than one sub-element, such as microdots or by pixel aggregation to form lower-resolution macro-pixels.

Much research has gone into improving print quality while also keeping-low the cost of the printer. One method of reducing costs is to provide basic colors (e.g. red/green/blue or cyan/yellow/magenta), and then generate other colors by arranging printed pixels to give the appearance of color shades and continuous tones (e.g. dithering). Except for certain print processes which blend each output pixels together (e.g. dye-sublimation or thermal-wax), color printing process is based on placing discrete dots on a page so that the net effect of the colors is the desired color to be generated. The visibility of each dot depends on the image being printed, the printing substrate, and the characteristics of the pen used to deliver the ink. To minimize dot visibility, different dithering patterns have been developed to optimize dot arrangement to minimize graininess. Some methods also use differing-sized dots to improve the continuous-seeming nature of the output.

A pixel printed to a page is composed of at least one microdot (droplet) of ink, the droplet being the smallest amount of ink a pen can output. Microdots are combined to generate pixels of differing weights (saturation). The number of droplets per pixel can be represented by the variable N. For example, for a mid-weight dot size, 6 microdots of ink may be sprayed to form the printed dot.

A problem faced by prior art printing techniques is that irrespective of the pattern or dot size used to generate an output image, the output driver (embedded in hardware or software) assumes that the quality of the ink transfer mechanism is consistent across each pen. For example, the controlling software/driver in an inkjet printer assumes each pen ejects the same amount of ink when producing a microdot. There is no compensation for pen-differences due to manufacturing variations. That is, due to such variations, the same type of pen (e.g. having nominal 8 picoliter microdots) may have slightly differing ink transfer mechanisms, resulting in different droplet sizes (e.g. 7 or 9 picoliters). Thus, a pen having heavier microdots, say 9 picoliters appears to produce more saturated output than a lighter 7 picoliter pen, even though both pens are expected to be producing 8 picoliter microdots. Preferred embodiments compensate for differing pens at the microdot level.

A preferred embodiment includes a printer having one or more pens for printing some number of pixels per inch on an output medium. Each pen has an associated characteristic drop volume to indicate the actual size of droplets expelled from the pen, as opposed to the nominally expected droplet volume. Preferred printers may print a range of microdots per pixel. In the following description, it is assumed that the printer is an inkjet-type printer capable of outputting between zero and 12 microdots per pixel. The number of possible microdots per pixel corresponds to differing levels of ink saturation. This range can be grouped into three luminosity levels by use of 3 different droplet patterns (e.g. 1 droplet, 3 droplets, 12 droplets).

The number of droplets per pixel for each of three saturation levels can be represented by the variables $N1$, $N2$, and $N3$. The values for $N1$, $N2$, and $N3$ can vary from zero to 12. For example, $N1$ can be 1, $N2$ can be selected from the group consisting of 1, 2, 3, and 4, and $N3$ can be selected from the group consisting of 3,4,5,6,7.8,9, 10, 11, and 12. Such use of three levels (four including zero) allows saturation to be represented using just two binary digits, thus speeding print processing.

Additionally, by storing a pen's actual droplet volume in a memory associated with each pen, the printer is able to adjust each droplet pattern in accord with the pen's characteristics. Thus, a user is no longer required to attempt manual compensation via driver-based saturation controls, or by modifying the original image. If the print driver is running on a computer, preferred embodiments include a graphical user interface to make hue shift, saturation and other print-time adjustments. Such print-time adjustments are in addition to automatic compensation for pen characteristics, and may further adjust the number of microdots per pixel, or the placement of the droplets within a pixel. Note that automatic pen compensation may also include adjusting for media (paper) type.

The foregoing and other features and advantages of the preferred embodiment of the present invention is more readily apparent from the following detailed description, which proceeds with reference to the accompanying drawings.

DETAILED DESCRIPTION OF PREFERRED EMBODIMENTS

Figure 1:
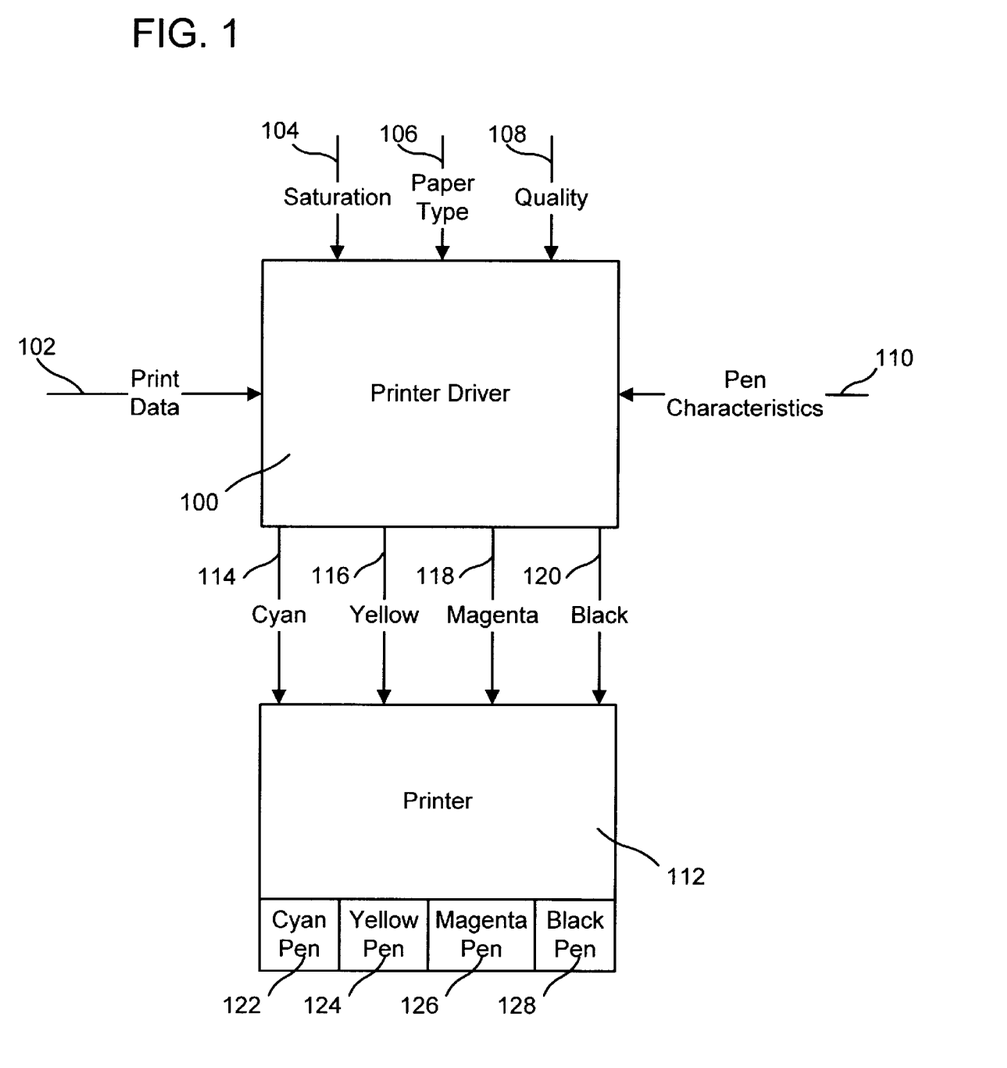
FIG. 1 shows a block diagram of a printer driver configured according to one embodiment of the invention.

FIG. 1 shows a block diagram of a printer driver 100 configured according to one embodiment of the invention.

The input data to the driver 100 corresponds to the data to be printed 102, along with supplemental data 104–108 to adjust the printing process, and pen characteristic data 110 identifying the characteristic drop volume of pens installed within the printer 112. The print data 102 corresponds to data generated by an application program or hardware device, and the saturation 104, paper type 106, and print quality (e.g. draft mode) 108 inputs correspond to user selected adjustments to the print process. These adjustments represent standard manipulations to the print data that are known in the prior art. How these adjustments 104–108 interact with claimed embodiments is more fully explained below in conjunction with FIG. 3.

The drop volume data 110 corresponds to data associated with each pen (see items 202–204 of FIG. 2) which indicates, e.g., the characteristic droplet size produced by a given pen. That is, during manufacture, slight process variations may cause the actual droplet volume of a pen to be slightly more or less than intended. Thus, an 8 picoliter (also measured in nanograms) pen may in fact produce 7 or 9 picoliter droplets instead of the intended 8. As discussed in conjunction with FIG. 2 below, the actual drop volume (e.g. 7 or 9) is specified to the printer driver 100 to allow the driver to compensate for errors in the pen manufacture.

Thus, given the raw print data 102, the user adjustments 104–108, and the pen characteristics 110, the printer driver combines these data to generate actual data 114–120 to be sent to the printer 112. This data may also include other non-color data, such as printer control codes (not shown). Claimed embodiments expect printers based upon the CYMK standard, having separate ink sources for the cyan 114, yellow 116. magenta 118, and black 120 colors. However, claimed embodiments do not require the CYMK system, and work with other systems such as RBGK (red, green, blue, black), or systems using a single pen or cartridge.

Figure 2:
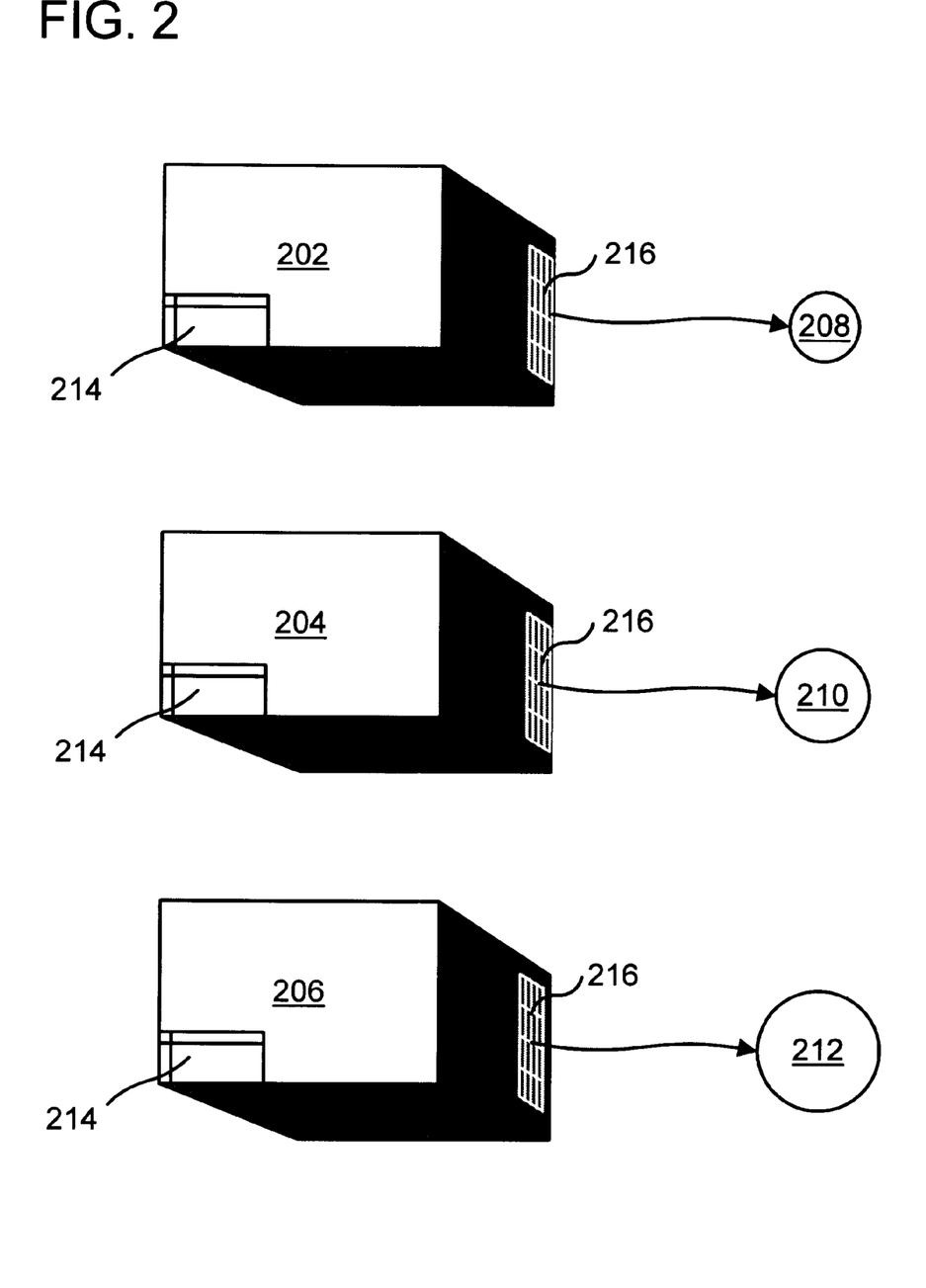
FIG. 2 shows three ink jet pens and their respective droplet volumes.

FIG. 2 shows three ink jet pens 202–206 installed within the printer 112 of FIG. 1, and their respective output 208–212. These pens are designed to eject a single 8 picoliter droplet of ink. However, their outputs 208–212 are not identical. Instead, the first pen 202 outputs a 7 picoliter droplet 208, the second pen 204 outputs a correct 8 picoliter droplet 210, and the third pen 206 outputs a 9 picoliter droplet 212. The discrepancy may be due to pen manufacturing variations, ink idiosyncrasies, etc. Therefore, given identical data to print, each of these pens respectively prints the image too light, just right, and too dark, where the expected output (number of drops) for a fully saturated pixel is as shown in the FIG. 3 table. Note that the FIG. 3 saturation values depend upon expected droplet weight from a given pen, and that the table values normally change for different pens. The values shown are based on an 8 picoliter pen; one aspect of the present invention is to allow print-time compensation for table values that are "wrong" with respect to a pen having manufactured to output an incorrect drop weight (i.e. not 8 picoliters).

Although such manufacturing variations are common, in the prior art a user had no recourse but to either accept the output as it is, attempt lightness/darkness adjustment through driver settings (see FIG. 3 S1–S5 user settings), or to re-adjust the source data. None of these solutions is satisfactory. Using lightness/darkness setting is not effective as it is likely to over or under compensate because stepping levels usually have large gradations (often a 20% change in ink usage). In addition, lightness/darkness adjustments are applied equally to all pens, when the problem is likely to be affecting only a single pen, or possibly, all pens differently. Thus, lightness/darkness settings will not help if a magenta pen is too dark but the cyan pen is too light. Adjusting the source data is not acceptable due to the risks and time consumption inherent in modifying the source data, and having different compensation controls for each color, although feasible, is computationally too burdensome.

Instead of these inadequate solutions, claimed embodiments allow compensation for individual pen characteristic variations at print time. To accomplish this, each pen in the illustrated embodiment has an associated memory 214 in which the characteristics of the pen are encoded. In the illustrated embodiment, this memory 214 encodes the characteristic droplet (microdot) size for the pen. When a user attempts to print with the printer, the memory 214 is read, and printing is automatically adjusted to compensate for the stored characteristic values. Thus, assuming that nominal 8 picoliter pens have been installed in a printer 110 (FIG. 1), but that one of the pens 208 incorrectly outputs 6 picoliter droplets, claimed embodiments adjust printer output to compensate for the pen's under-saturation of print requests. Such compensation includes adjusting pixel saturation values, as well as droplet pattern usage.

Figure 3:
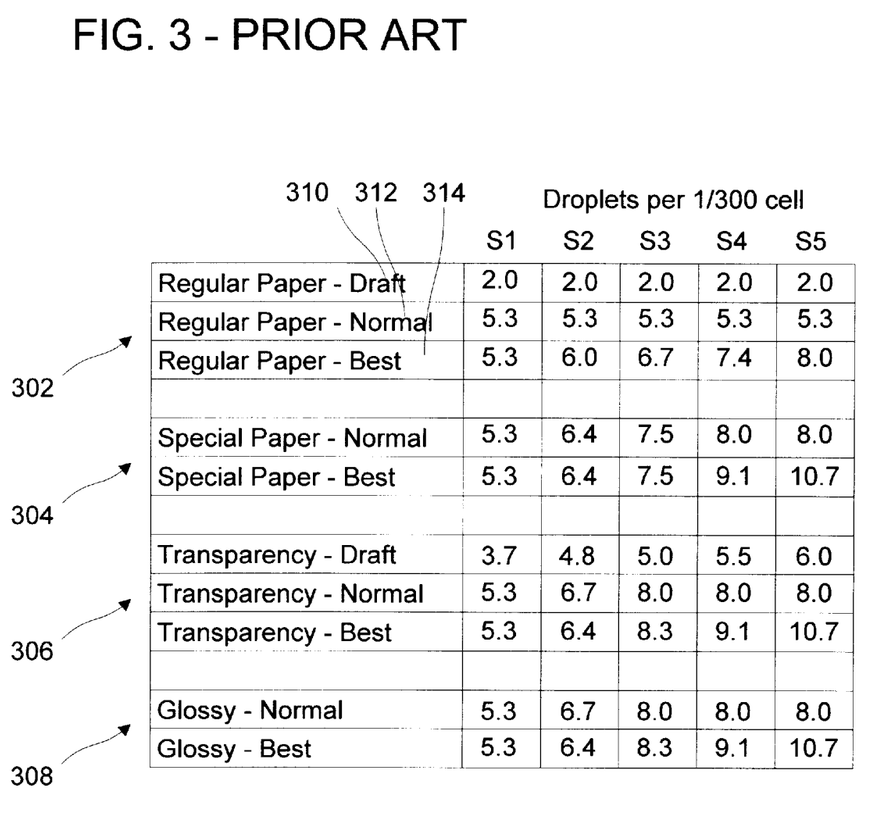
FIG. 3 is a table showing the number of droplets necessary to achieve pixel color saturation on different media types.

FIG. 3 shows a table indicating a standard number of droplets a preferred embodiment outputs on a page depending on a user's selection of type of paper type, desired output quality, and saturation adjustment (S1–S5). The values shown in the table represent the number of drops required for producing very saturated output. In a preferred embodiment, the S1–S5 setting are a range for user output adjustment (prior art) plus drop weight compensation (new; see FIG. 1 discussion).

Having saturation controls S1–S5 available to a user is well known in the prior art, as prior art printing solutions need a basis from which to calculate user adjustments to data to send to the printer. However, this data also forms the basis on which claimed embodiments generate microdot patterns, and compensate for pen characteristics. Claimed embodiments support other paper types besides those shown; shown are values for regular paper 302 (copier-type or other paper not specifically designed for Inkjet printing), special paper 304 (paper designed for use in inkjet printers), transparency 306, and glossy paper 308 (best quality photo-like paper).

At print time, preferred embodiments allow a user to select print-quality speeds including draft mode 310, normal (standard) mode 312, and best (highest quality) mode 314. As shown, not all paper types support all printing modes. Determination of which modes are supported is determined by the characteristics of the output medium.

Columns S1 through S5 indicate user selectable saturation (lightness and darkness) adjustment. For this specification, it is assumed that there are five levels, in which S3 is the default ink saturation, and where each stepping can substantially adjust saturation values (e.g. Glossy Best S3 to S2 is approximately a 30% reduction in ink). In claimed embodiments, a user may use a print-time interface for selecting media type, print speed, and saturation adjustment. This interface is incorporated into a print driver (see FIG. 1) based in software, embedded into the printer, or through a combination of both. For printer-based configuration, the user selections are made through controls on the printer.

As shown, the number of drops varies according to the selected paper types, output quality and saturation levels. The goal is to maintain high print quality across different media by adjusting to different media through use of different ink output. The values are set based on achieving the maximum intensity with minimal drop weight. It is necessary to adjust to different media since different media absorb ink differently. As shown in the chart, there are several output qualities 310, 312, 314, but preferred embodiments may support more quality levels.

In a preferred embodiment, the default saturation level is S3. Thus, for example, a review down column S3 of each Normal quality output indicates regular paper 302 receives 5.3 droplets per dot, special paper 304 receives 7.5, transparencies 306 receive 8.0, and glossy paper 308 receives 8.0. Note that the chart reflects mathematical accuracy, and since pens cannot output partial droplets, the printer/driver adjusts the number of microdots used in adjacent pixels to average-out the print to the indicated table values.

Figure 4A:
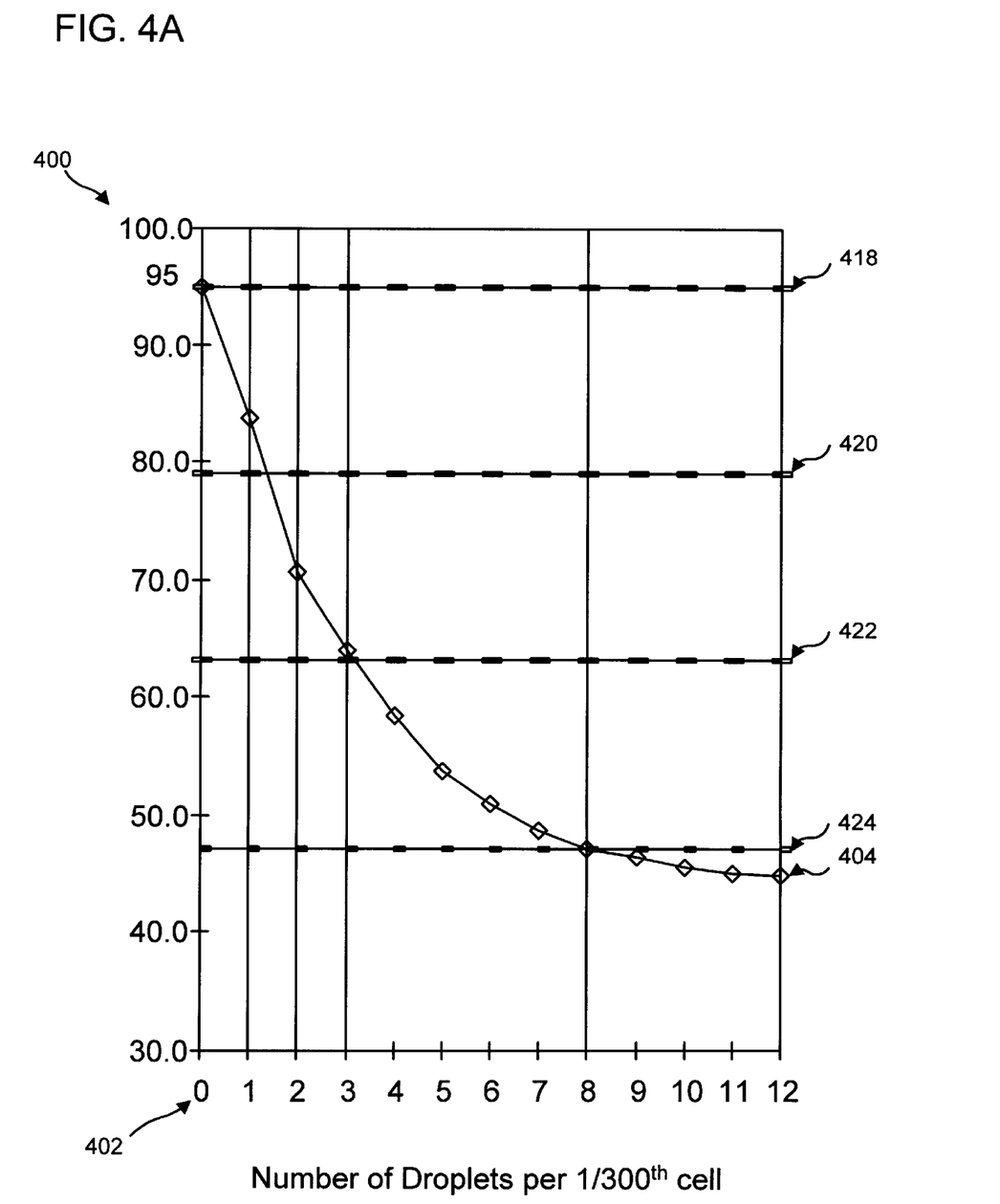
FIGS. 4A–4C are charts plotting perceived CMY color saturation versus the number of microdots output to an output medium.
Figure 4B:
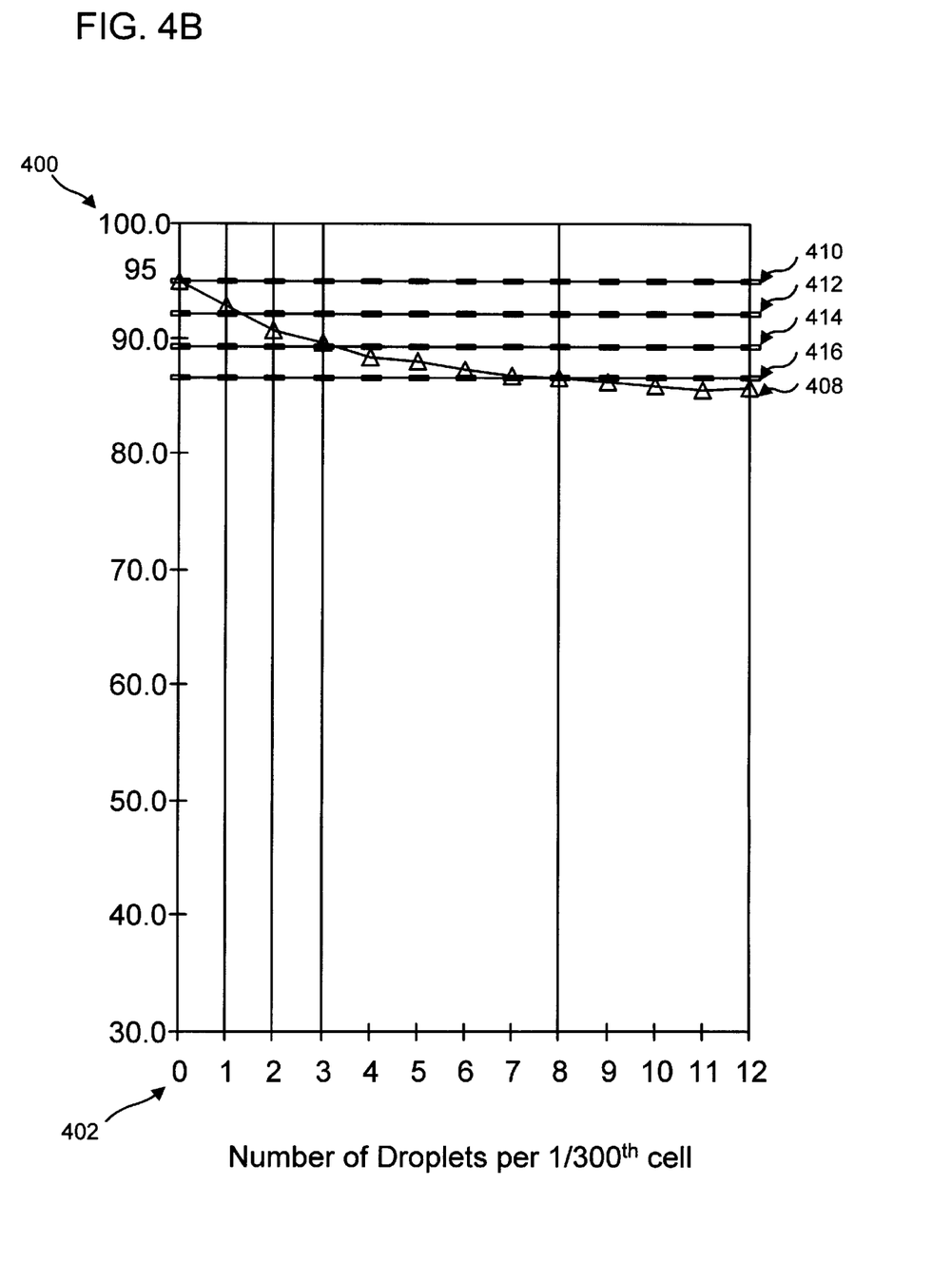
Figure 4C:
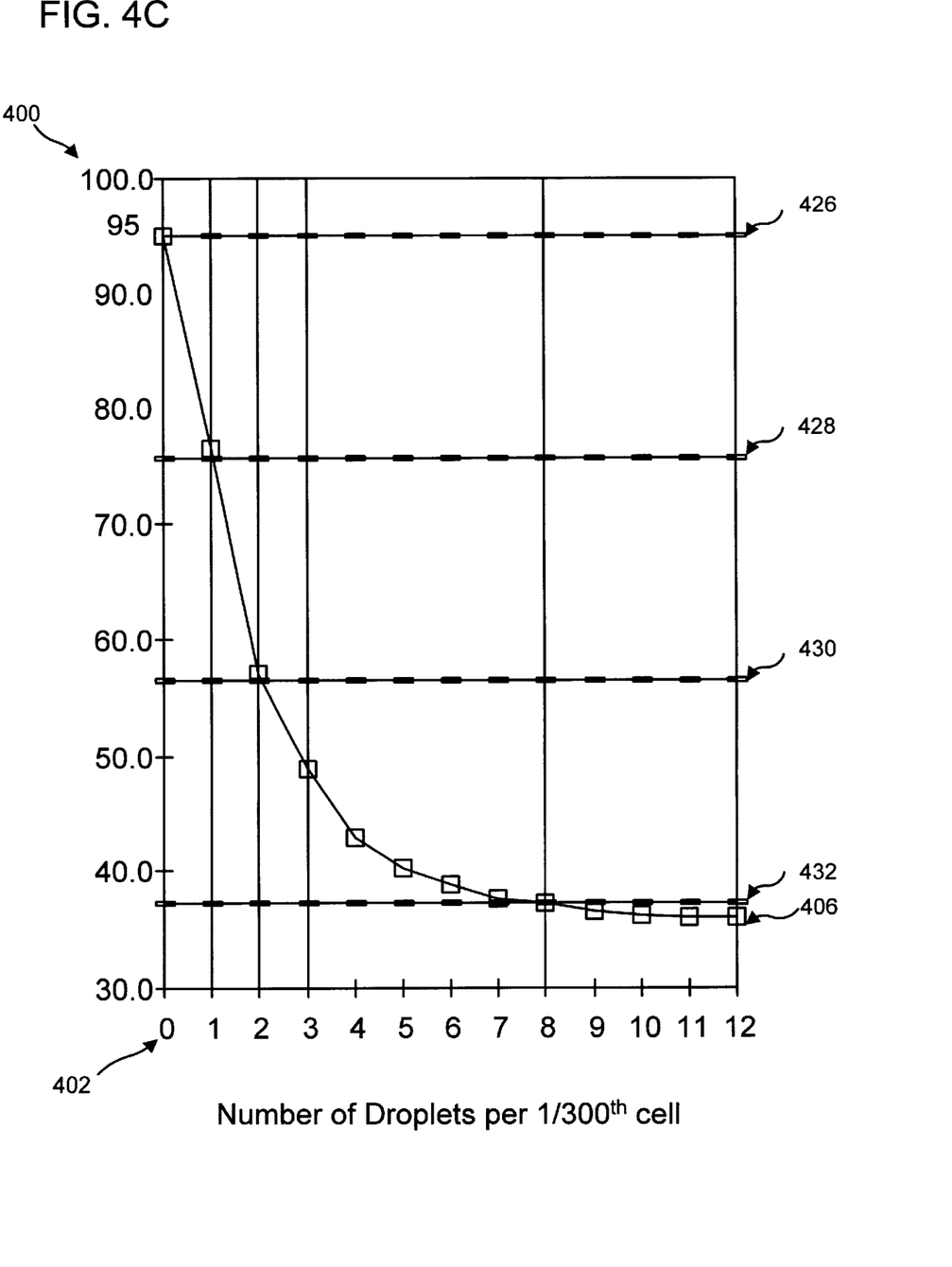

FIGS. 4A–4C are charts plotting perceived CMY color saturation versus the number of microdots output to an output medium. Shown are print results from using Special Paper 304 (FIG. 3). The left-side scale 400 corresponds to the whiteness (luminosity level) of the paper after application of ink to the paper. In this particular example, the paper used had a blank luminosity value of 95%. The bottom scale 402 corresponds to the number of microdots output to the paper. For FIGS. 4A–4C, it is assumed that each microdot is 8 picoliters in volume, and that there are at most 12 such droplets per pixel. Different curves can be generated for different droplet volumes.

Respectively shown in FIGS. 4A–4C are plots for cyan ink 404, magenta 406, and yellow 408 ink colors. For each color, the range of pixel luminosity values (e.g. printing no ink through using all 12 droplets) is broken into three roughly equal sections, such breaks indicated by four horizontal lines associated with each color. The reason for breaking up the luminosity range in this fashion is to reduce the number of bits per pixel that must be sent to the printer. The use of four levels is somewhat arbitrary, and is based on the processing speed of the printer and/or the host computer. The invention supports more levels. More levels are useful when maintaining resolution but printing with smaller drop volume pens. Other embodiments having faster raster or RIP engines allow more levels, up to and including all droplets (in this case 12). Shown in FIG. 4A are the four cyan levels 418–424, in FIG. 4B the four yellow levels 410–416, and in FIG. 4C the four magenta levels 426–432. Note that in each figure, each color has the same starting state 410, 418, 426 of no-ink, which is the 95% luminosity of the blank paper used in this example.

For each color, luminosity is charted as a function of the number of droplets in a pixel. The range of saturation (luminosity) values is broken into four levels represented by no ink (blank paper), full saturation, and two levels in-between. The levels roughly equally divide the luminosity range. The reason for this division is two-fold.

First, the ratio of luminosity values versus volume of ink used shows a decreasing rate of return on added ink usage, and it is therefore unnecessary to use all droplets. For example, consider the four levels 426, 428, 430, 432 for magenta (FIG. 4C). No ink is shown as level 426, near complete saturation is shown as level 432, and the two intermediate stages are shown as levels 428 and 430. The fourth magenta level 432 is printed through use of 8 microdots of ink, not 12, as the saturation value is nearly identical, but with 25% less ink usage. That is, as perceived by the human eye, placing 8 microdots is nearly visually equivalent to placement of 12 microdots. (Also, the extra ink may bleed through the paper and ruin the output.) Level 430 saturation is achieved by 2 droplets, and level 428 saturation is achieved by 1 droplet. The 4 saturation levels of this pen may thus be represented by the series 0-1-2-8.

This use of 8 microdots for full saturation 432, rather than 12, affords flexibility to compensate for pen variations. If the actual pen droplet size is 10% less than expected, 9 microdots can be used instead of 8. Likewise, if the actual pen droplet size is 25% more than expected, 6 microdots can be used instead of 8. Similar compensation can be effected at the other saturation levels 428, 430. By this arrangement, saturation uniformity is maintained across plural pens (or saturation accuracy is achieved for a single pen) notwithstanding deviation from the expected droplet volume.

Sometimes saturation levels fall between, e.g., 1 and 2 droplets. For example, consider the plot of the cyan ink 404 (FIG. 4A). Desired saturation level 420 is at 80% luminosity. However, a single droplet yields 85% luminosity, and 2 droplets yield 72% luminosity. In such situations, the printer driver can dither, alternating between level 1 and level 2 (1 and 2 droplets) to achieve an approximate 80% luminosity.

In order to achieve saturation values between the 4 levels 418–424, such as a 55% cyan saturation, it is ink-wise and computationally less expensive to approximate 55% saturation by successive output of 3 microdots and 8 microdots such that the output averages to 55%, rather than to have the printer directly print 5 microdots.

According to FIGS. 4A–4C, cyan and yellow have a print pattern of 0-1-3-8, respectively indicating the number of droplets printed at each of the four output states. Magenta uses a 0-1-2-8 pattern. Using such levels reduces data sent to the printer by allowing 2 bits to be used to encode the number of droplets, rather than directly encoding how many droplets to use (which would take at least 3 bits if we assume only up to 7 droplets per pixel). For any drop weight/intensity, the goal is to achieve the four equally spaced lightness levels as closely as possible to minimize granularity and printing artifacts.

If one did not change the saturation levels (i.e. printing at S3), one would always use the 0-1-3-8 levels for all printing requests. These levels are set based upon achieving the maximum output intensity for minimal drop weight. Thus, when printing a dark color with a high drop volume pen, the printer switches between 3 and 8 drops per pixel, to average out to the correct overall darkness desired. Preferred embodiments, even without user adjustment, allow the printer to use different pixel values to compensate for different characteristic drop weights. The imaging system is aware of the ink levels in use and generates the printer image accordingly. The printer driver selects pixel volumes based upon actual levels supported by the printer (e.g. less expensive printers may support different dot patterns), where such selection is made with respect to the characteristic drop volume of installed pens.

Consequently, pens having characteristic drop volumes of 6–10 picoliters, will respectively use patterns of 0-1-3-8, 0-1-3-7, 0-1-2-7, 0-1-2-6, 0-1-2-5, instead of the 0-1-3-8 pattern for all pens. That is, although a printer could use the same 0-1-3-8 pattern and just adjust for encoded characteristic drop volume by dithering output by alternating between pixel weights (e.g. 3 and 8 droplets), a preferred system alternates the pixel weight pattern and dithers only if still necessary.

Figure 5A:
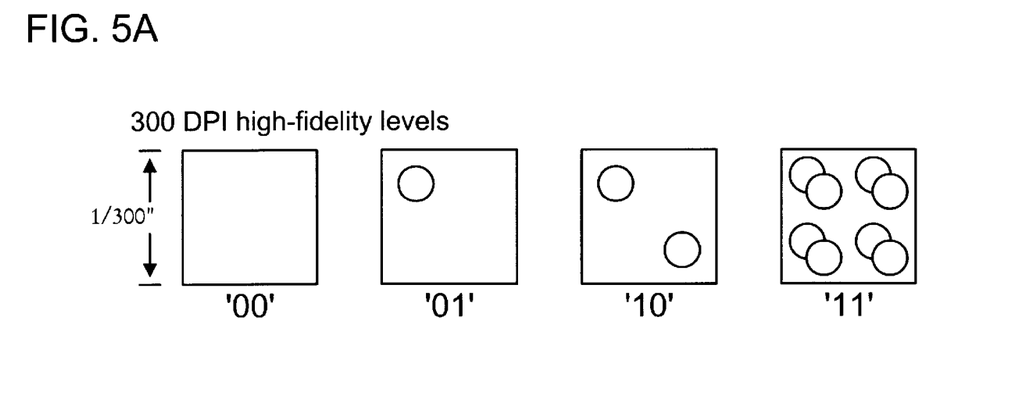
FIG. 5A shows a 0-1-2-8 dot pattern for outputting droplets on an output medium.
Figure 5B:
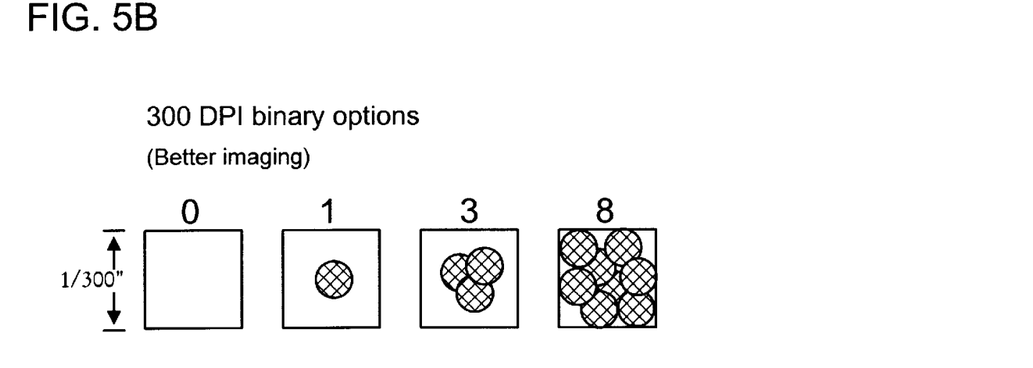
FIG. 5B shows a 0-1-3-8 dot pattern for outputting droplets on an output medium.

FIGS. 5A and 5B respectively show a 0-1-2-8 and 0-1-3-8 dot patterns that embodiments may use for outputting droplets (microdots) on paper. Note that when printing at 300 DPI, the exact location of the pixels is somewhat randomized, and the shown droplet overlap is to illustrate the number of droplets per pixel, not the exact position of such droplets. The randomization of the droplet location helps prevent banding in some output formats. Alternate preferred embodiments may allow microdot placement to be controlled by the printer's driver, but present performance issues relegate dot-placement in 300 DPI printing to automatic control by the printer. The patterns shown in FIG. 5A are labeled 00, 01, 10, and 11, corresponding to the binary digits used to represent which print state to use. During printing, the printer is instructed what dot patterns correspond to each binary reference. Preferred printers do not, however, employ completely random placement of the droplets, although such placement is possible. Instead, for 1, 2, and 3 droplet patterns, preferred printers randomly select one of the drop patterns shown in corresponding columns of FIG. 6B (see below).

FIG. 5B shows a 0-1-3-8 pattern. As with FIG. 5A, each of these patterns is associated with one of the four states (represented by 2 bits), and the exact location of the droplets is controlled by the printer. Note that FIG. 5B also corresponds to printers printing at 600 DPI, but processing 300 DPI data and generating 300 DPI output through superpixelation, or combining four 600 DPI pixels into a single 300 DPI macro-pixel. Such superpixelation allows for greater ink coverage provided by binary 600 DPI printing (i.e. 8 pixels placed in level "11" pixels), while maintaining compatibility with lower resolution data.

For both print patterns, claimed embodiments utilize the dot patterns to approximate the illustrative values shown in FIG. 3, and the given pattern is chosen according to the analysis described in conjunction with FIGS. 4A–4C. That is, for a given color, FIGS. 4A–4C indicate which pattern is most likely to give accurate print results, and this pattern is used to approximate the saturation values of FIG. 3. Although this disclosure assumes only 4 output states requiring 2 bits per pixel, claimed embodiments may use more bits per pixel to achieve more print states (FIGS. 4A–4C horizontal dividing lines). The number of states depends on the ratio between DPI resolution and the size of a microdot that the printer can output. For an 8 picoliter microdot output, only about 8 distinct microdots can be output. More than 8 microdots results in microdots overlaying each other and not contributing much to visual saturation, hence the plot of a decreasing rate of return on luminosity versus ink usage.

However, embodiments using 4 picoliter or smaller droplets allow a larger number of distinct droplets per pixel. In these configurations, more than four print states (FIGS. 4A–4C horizontal lines) are visually distinguishable, so such embodiments use 3–4 bits of data to encode pixel pattern information. An advantage of having more pixel patterns is that the print method may be adjusted to correspond to the image being printed. For example, left-weighted pixels may be printed when trying to print the right edge of an object (in effect, applying anti-aliasing techniques).

Figure 6A:
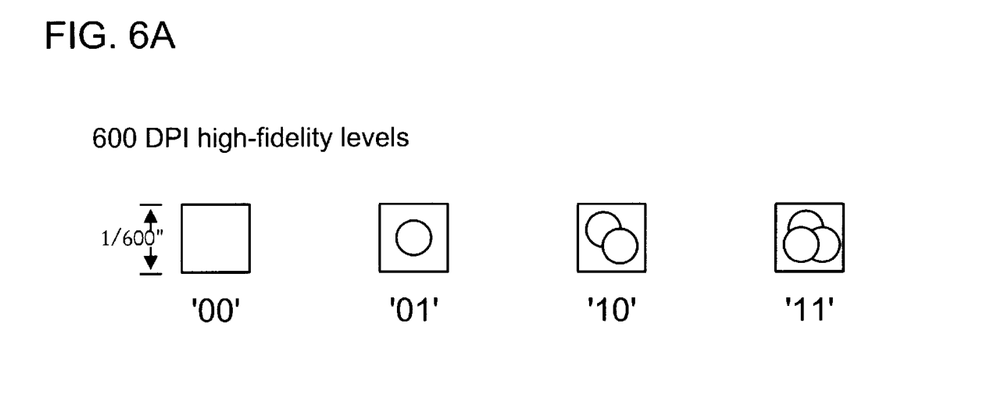
FIG. 6A shows four dot patterns where the pixel resolution is 600 DPI.

Shown in FIG. 6A are four patterns paralleling the patterns of FIG. 5A, but where the pixel resolution is 600 DPI. The higher DPI allows for printing with higher detail (edge resolution, smoother halftones). Generally, high-fidelity printing improves print quality by decreasing the droplet size to increase the number of droplets used in a given pixel. Increasing the number of droplets per pixel increases the number of color levels per pixel, yielding better print quality without having to resort to higher DPI printers. For example, a claimed embodiment using an 8 picoliter droplet allows printing 3 droplets per 600 DPI, allowing printing 64 shades per pixel instead of the standard 8 shades achieved by standard binary printing. In the FIG. 6A embodiment, the drop size is very large in relation to the cell size, and 2 bits will address all possible states. Although this provides the best possible output, it consumes more resources (I/O bandwidth, image processing, RAM in printer, etc.) than 300 DPI 2 bit high fidelity printing at the same drop weight.

Figure 6B:
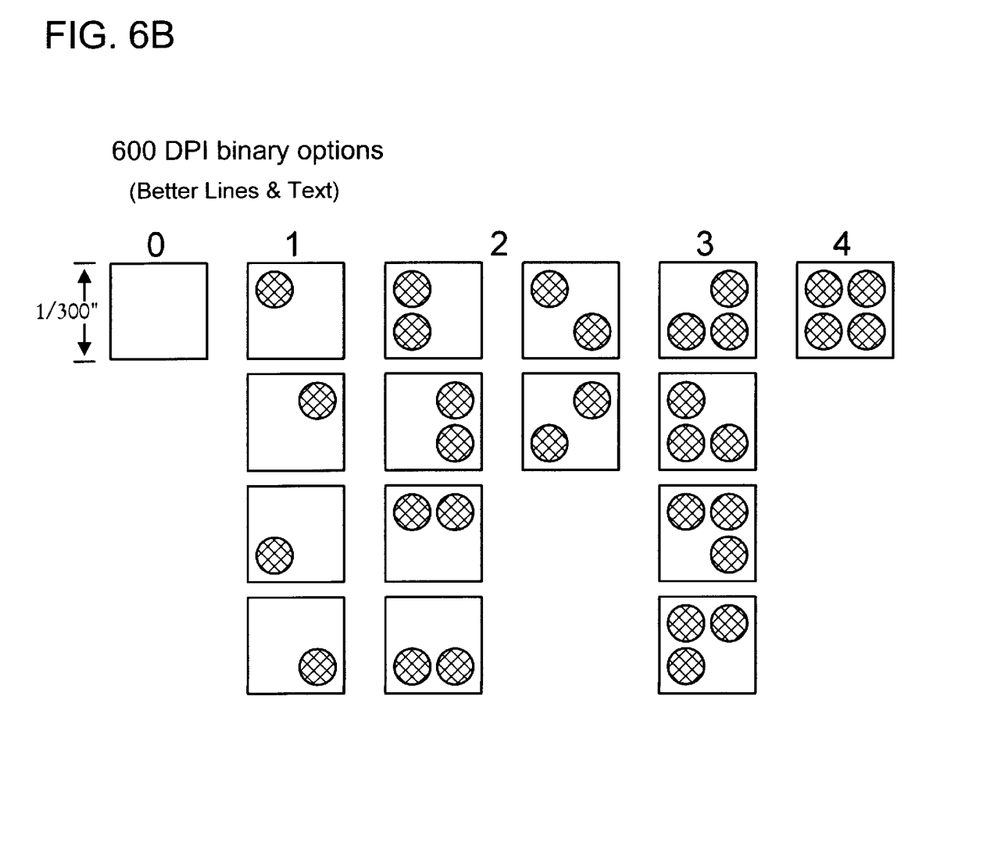
FIG. 6B shows a 600 DPI droplet pattern where the droplet locations are individually addressable.

Shown in FIG. 6B are four patterns labeled 0, 1, 2, 3 and 4, representing four bits per pixel data corresponding to 16 different droplet patterns. The FIG. 6B configuration is geared towards printing high-resolution text, and unlike the 300 DPI modes of FIGS. 5A and 5B, the droplets shown in FIG. 6B are directly addressable. There are up to four droplets per pixel. Alternate embodiments may elect to use only a subset of all 16 patterns to reduce the number of bits required per pixel. The FIG. 6A 600 DPI configuration may be used to produce the 300 DPI output by combining four 600 DPI cells to generate different 300 DPI pixels (superpixelation). In effect, one may apply half-toning principles to combine four 600 DPI pixels into a single 300 DPI macro-pixel.

Having described and illustrated the principles of my invention with reference to a preferred embodiment, it should be apparent to those skilled in the art that the invention can be modified in arrangement and detail without departing from such principles. For example, while the system is illustrated with reference to pens that have actual droplet volumes encoded thereon, this need not be the case. This data may be stored elsewhere, or may be model based, e.g., on environmental factors rather than measured and stored.

In view of the wide range of embodiments to which the principles of my invention may be applied, it should be recognized that the detailed embodiment is illustrative and should not be taken as limiting my invention. Accordingly, I claim as my invention all such modifications as may come within the scope and spirit of the following claims and equivalents thereto.

What is claimed is:

1. A method of ink-jet printing comprising:
   defining at least a first, second, and third level of printing saturation the levels characterized by a number of droplets of ink per pixel (N);
   in the first level, ejecting N1 droplets of ink per pixel;
   in the second level, ejecting N2 droplets of ink per pixel;
   in the third level, ejecting N3 droplets of ink per pixel;
   the method further including receiving data related to a characteristic droplet volume associated with a printing system, and setting the value of at least one of {N1, N2, or N3} in accordance with the received data.

2. A method according to claim 1, the method including setting the value of at least two of {N1, N2, or N3} in accordance with the received data.

3. A method according to claim 1, in which the receiving step includes reading data from a memory element associated with an ink jet pen.

4. A method according to claim 1, in which N1 is one, irrespective of the received data.

5. A method according to claim 1, in which N2 is selected from the group consisting of 1, 2, 3, and 4, in accordance with the received data.

6. A method according to claim 1, in which N3 is selected from the group consisting of 3, 4, 5, 6, 7, 8, 9, 10, 11, and 12, in accordance with the received data.

7. A printer driver having computer-executable instructions for performing the steps recited in claim 1.

8. A computer-readable medium having computer-executable instructions for performing the printer driver of claim 7.

9. A print system having a printer for printing a predetermined number of pixels per inch on a media type, each such pixel having a saturation value from zero to $N_{max}$, zero representing no ink for the output pixel and $N_{max}$ being the maximum number of ink drops the printer can print for such pixel, the system comprising:

a pen installed within the printer for forming a pixel by transferring a plurality of ink drops to the media type, the pen having a characteristic drop volume corresponding to a typical volume of ink expelled for a single drop of ink from the pen;

a memory storing computer instructions for a printer driver for receiving print data, the print data indicating a saturation value for an output pixel; and     adjustment means for adjusting the saturation for the output pixel, such means further defining at least three saturation levels subdividing a range of zero to $N_{max}$, each such level represented by a different number of ink drops per pixel, where if the saturation value is not equal to one of the saturation levels, then the saturation value is adjusted to equal one of the levels.

10. A print system according to claim 9, wherein at least two of the saturation levels vary according to the characteristic drop volume of the pen.

11. A print system according to claim 9, the system further comprising a memory associated with the pen for recording the characteristic drop volume of the pen.

12. A print system according to claim 9, the system further comprising an input associated with the printer driver for receiving a medium type, such medium type causing, for a particular saturation level, a change in the number of ink drops per pixel characterizing such level.

13. A print system having a printer for printing a predetermined number of pixels per inch on a plurality of different media types, each pixel formed of up to a number of ink drops (N), the printer comprising:

a pen for forming a pixel by transferring a plurality of ink drops to a media type, the pen having a characteristic drop volume corresponding to the typical volume of ink expelled for a single drop of ink from the pen; and     a memory for storing a plurality of look up tables, each table having entries defined with respect to an expected pen drop volume, each entry indicating for a particular media type a number of ink drops to use to form a pixel on such media;

wherein according to the characteristic drop volume of the pen, entries from a corresponding look up tables are used to determine a number of ink drops to output per pixel from the pen.

14. A print system according to claim 13, wherein the corresponding look up table is selected according to which of the plurality of tables was defined with respect to an expected pen drop volume nearest to the drop volume of the pen.

\* \* \* \* \*